US012105447B2

(12) United States Patent
Song et al.

(10) Patent No.: US 12,105,447 B2
(45) Date of Patent: Oct. 1, 2024

(54) CLEANING BIAS VOLTAGE CONTROL

(71) Applicant: Hewlett-Packard Development Company, L.P., Spring, TX (US)

(72) Inventors: Jung Hun Song, Seongnam-si (KR); Do Geun Kim, Seongnam-si (KR); Jeong Hwan Kim, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/033,027

(22) PCT Filed: Jun. 18, 2021

(86) PCT No.: PCT/US2021/037988
§ 371 (c)(1),
(2) Date: Apr. 20, 2023

(87) PCT Pub. No.: WO2022/093332
PCT Pub. Date: May 5, 2022

(65) Prior Publication Data

US 2023/0384715 A1 Nov. 30, 2023

(30) Foreign Application Priority Data

Oct. 27, 2020 (KR) ........................ 10-2020-0140568

(51) Int. Cl.
*G03G 15/16* (2006.01)
*G03G 15/00* (2006.01)

(52) U.S. Cl.
CPC ....... *G03G 15/161* (2013.01); *G03G 15/1675* (2013.01); *G03G 15/5037* (2013.01)

(58) Field of Classification Search
CPC ............. G03G 15/161; G03G 15/1675; G03G 15/168; G03G 15/5037; G03G 15/5041;
(Continued)

(56) References Cited

U.S. PATENT DOCUMENTS 6,160,969 A * 12/2000 Ishigaki ............. G03G 15/5041 399/49
7,313,335 B2 12/2007 Shida
(Continued)

FOREIGN PATENT DOCUMENTS

JP H04-178680 A 6/1992
JP 2005-266604 A 9/2005

*Primary Examiner* — Carla J Therrien
(74) *Attorney, Agent, or Firm* — Foley & Lardner LLP

(57) ABSTRACT

An example image forming apparatus includes a power device, a photosensitive drum, a transfer device to remove remaining toner based on a cleaning bias voltage, an optical sensor to detect remaining toner, and a processor to adjust the cleaning bias voltage based on a set offset bias voltage. The processor may change a surface potential of the photosensitive drum to a voltage of a set pattern using the power device, acquire a size ratio of a periodic component based on a frequency of a signal detected from the remaining toner using the optical sensor, and, based on the acquired size ratio of the periodic component being greater than or equal to a set size ratio, adjust the cleaning bias voltage based on an offset bias voltage corresponding to the size ratio of the periodic component and provide the adjusted cleaning bias voltage to the transfer device to remove remaining toner.

15 Claims, 14 Drawing Sheets

(58) Field of Classification Search
CPC ........... G03G 15/5054; G03G 15/5058; G03G 21/0064; G03G 2215/1647; G03G 2221/0005; G03G 2221/0068
See application file for complete search history.

(56) References Cited

U.S. PATENT DOCUMENTS

| | | | | |
|---|---|---|---|---|
| 9,207,558 | B2 | 12/2015 | Hasegawa et al. | |
| 9,639,032 | B2 | 5/2017 | Tanaka | |
| 10,372,071 | B2 | 8/2019 | Minato | |
| 2003/0053813 | A1* | 3/2003 | Kida .................... | G03G 15/168 399/101 |
| 2007/0036578 | A1 | 2/2007 | Fukami et al. | |
| 2008/0118259 | A1 | 5/2008 | Yamada | |
| 2014/0178087 | A1 | 6/2014 | Suzuki et al. | |
| 2015/0346652 | A1* | 12/2015 | Ohmura ............. | G03G 15/1675 399/101 |
| 2018/0259885 | A1* | 9/2018 | Takahashi ............ | G03G 15/161 |

* cited by examiner

FIG. 8

| CLASSIFICATION | | | | ENV 0 | ENV 1 | | ENV 6 | ENV 7 | ENV 8 |
|---|---|---|---|---|---|---|---|---|---|
| PRINTING SPEED | OPERATION | Ratio | | | | | | | |
| 70PPM | Pre | 0% | 9% | 0 | 0 | | 0 | 0 | 0 |
| | | 10% | 19% | 0 | 0 | | 0 | 0 | 0 |
| | | 20% | 29% | 0 | 0 | | 0 | 0 | 0 |
| | | 30% | 39% | -10 | -10 | | -20 | -30 | -30 |
| | | 40% | 49% | -40 | -40 | | -50 | -60 | -60 |
| | | 50% | 59% | -70 | -70 | | -80 | -90 | -90 |
| | | 60% | 69% | -100 | -100 | ... | -110 | -120 | -120 |
| | | 70% | 79% | -130 | -130 | | -140 | -150 | -150 |
| 70PPM | Post | 0% | 9% | 0 | 0 | | 0 | 0 | 0 |
| | | 10% | 19% | 0 | 0 | | 0 | 0 | 0 |
| | | 20% | 29% | 0 | 0 | | 0 | 0 | 0 |
| | | 30% | 39% | -30 | -30 | | -40 | -50 | -50 |
| | | 40% | 49% | -80 | -80 | | -90 | -100 | -100 |
| | | 50% | 59% | -130 | -130 | | -140 | -150 | -150 |
| | | 60% | 69% | -180 | -180 | | -190 | -200 | -200 |
| | | 70% | 79% | -230 | -230 | | -240 | -250 | -250 |

CLEANING BIAS VOLTAGE CONTROL

CROSS-REFERENCE TO RELATED APPLICATIONS

This application is a U.S. National Stage Patent Application under 35 U.S.C. 371 of PCT/US2021/037988, filed Jun. 18, 2021, which claims priority to KR Patent Application No. 10-2020-0140568, filed Oct. 27, 2020, which are hereby incorporated by reference in their entireties.

BACKGROUND

An image forming apparatus refers to an apparatus which prints printing data generated at a terminal apparatus like a computer on a printing medium such as paper. As examples of such an image forming apparatus, there may be copiers, printers, facsimiles, scanners, or multi-function printers (MFPs) which multiply implement functions of the aforementioned apparatuses through one apparatus, etc.

BRIEF DESCRIPTION OF THE DRAWINGS

FIG. 8 is a diagram illustrating an offset table of a cleaning bias voltage according to an example;

DETAILED DESCRIPTION

Hereinafter, various examples will be described with reference to the drawings. The examples described below may be implemented while being modified into several different forms.

A description that one element is "connected to" another element may be interpreted to include both the case where one element is 'directly connected to' another element, and the case where one element is 'connected to another element through still another element.' Also, a description that one element "includes" another element can be interpreted to mean that other elements may additionally be included, but not that other elements are excluded, unless there is a specific description to the contrary. Each example may be implemented or operated independently, but each example may also be implemented or operated in combination.

The term "image forming job" may refer to any of various kinds of jobs (e.g., copying, printing, scanning, or faxing) related to an image such as formation of an image, generation/storing/transmission of an image file, etc. Also, the term "job" may refer not only to an image forming job, but also include any of a series of processes necessary for performing an image forming job.

The term "printing data" may refer to data converted to a printable format at a printer. If a printer supports direct printing, a file itself may become printing data.

The term "image printing apparatus" may refer to an apparatus that prints printing data generated at a terminal apparatus like a computer on a recording medium such as paper. As examples of such an image forming apparatus, there may be copiers, printers, facsimiles, scanners, or multi-function printers (MFPs) which multiply implement functions of the aforementioned apparatuses through one apparatus, etc.

The term "user" may refer to a person who performs manipulations for an image forming apparatus.

The term "background phenomenon" may refer to toner that remains on a photosensitive drum or a transfer device. Toner that remains due to a background phenomenon may pollute a rear surface of a transfer device or a printing medium.

Examples described herein may prevent pollution of a rear surface of a transfer device or a printing medium by a background phenomenon according to a state of a photosensitive drum.

Figure 1:
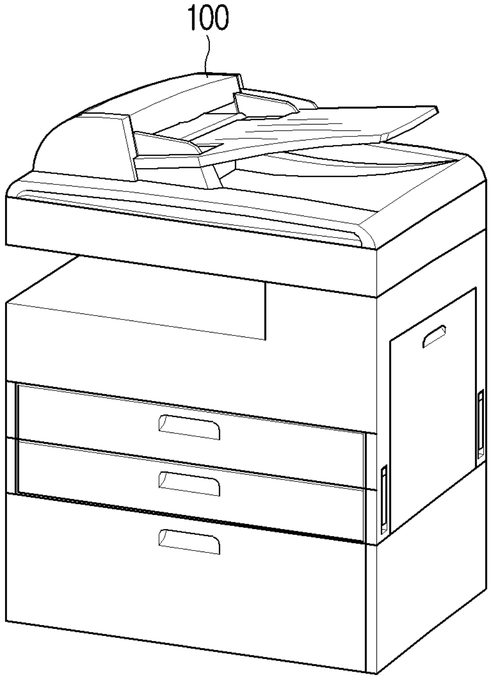
FIG. 1 is a diagram illustrating an image forming apparatus according to an example.

FIG. 1 is a diagram illustrating an image forming apparatus according to an example.

Referring to FIG. 1, an image forming apparatus 100 may perform an image forming job. The image forming job may include repeatedly performing a process of sequentially charging, exposing, developing, transferring, and fusing by using an image forming engine, and forming an image on a printing medium (e.g., paper). An image forming engine may include a photosensitive drum, a transfer device, a fusing device, etc. The image forming apparatus 100 may apply a voltage corresponding to image data to the photosensitive drum, and the photosensitive drum may transmit toner to the transfer device. The transfer device may transfer the transmitted toner to a printing medium and the fusing device may fuse the toner transferred to the printing medium, thereby performing an image forming job. When an image forming job is completed, the image forming apparatus 100 may apply a cleaning bias voltage of an opposite polarity to that of the voltage applied to the photosensitive drum to the transfer device. The cleaning bias voltage applied to the transfer device may separate toner that remains on the transfer device from the transfer device. However, in a case in which the toner receives stress (e.g., the toner is not charged to a desired level), the remaining toner may not be completely removed by the applied cleaning bias voltage. The remaining toner that was not removed may become a factor for polluting a rear surface of a printing medium when a subsequent image forming job is performed.

In an example, the image forming apparatus 100 may identify whether there is a background and, if there is a background, apply a cleaning bias voltage that is adjusted by an offset bias voltage to the transfer device. For example, the image forming apparatus 100 may identify whether there is a background by applying a voltage of a set pattern to the photosensitive drum by using a power device. In an example, the voltage of the set pattern may be a voltage wherein a number of times of applying a voltage set for a specific time period, a voltage size, and an application cycle are changed. In case a background exists, a background of a specific pattern may be formed on the transfer device by the voltage of the set pattern. The image forming apparatus 100 may detect a signal from the background by using an optical sensor. The image forming apparatus 100 may acquire a size ratio of a periodic component based on a frequency of the detected signal. In case the size ratio of the periodic component is greater than or equal to a specific size ratio, the image forming apparatus 100 may determine that a background exists.

In case the image forming apparatus 100 determines that a background exists, an offset bias voltage corresponding to the size ratio of the periodic component may be applied to the existing cleaning bias voltage. For example, an offset bias voltage may be a bias voltage that reduces an absolute value of a cleaning bias voltage. Also, an offset bias voltage may be a voltage that changes according to the acquired size ratio of the periodic component, the printing speed, or the temperature or the humidity of a surrounding environment of the image forming apparatus, and may indicate a positive correlation with the temperature or the humidity of the surrounding environment. As an example, an offset bias voltage may be generated as a table corresponding to the acquired size ratio of the periodic component, the printing speed, and the temperature or the humidity of the surrounding environment of the image forming apparatus, and stored in the memory.

Accordingly, the image forming apparatus 100 may acquire an offset bias voltage corresponding to the acquired size ratio of the periodic component, the printing speed, and the temperature or the humidity of the surrounding environment of the image forming apparatus 100 from the memory, and adjust the existing cleaning bias voltage based on the acquired offset bias voltage. The image forming apparatus may remove the background as much as possible by applying the cleaning bias voltage adjusted based on the offset bias voltage to the transfer device.

In FIG. 1, an example process wherein the image forming apparatus 100 removes the background was described briefly. Hereinafter, an example process wherein the image forming apparatus 100 removes the background will be described in more detail.

Figure 2:
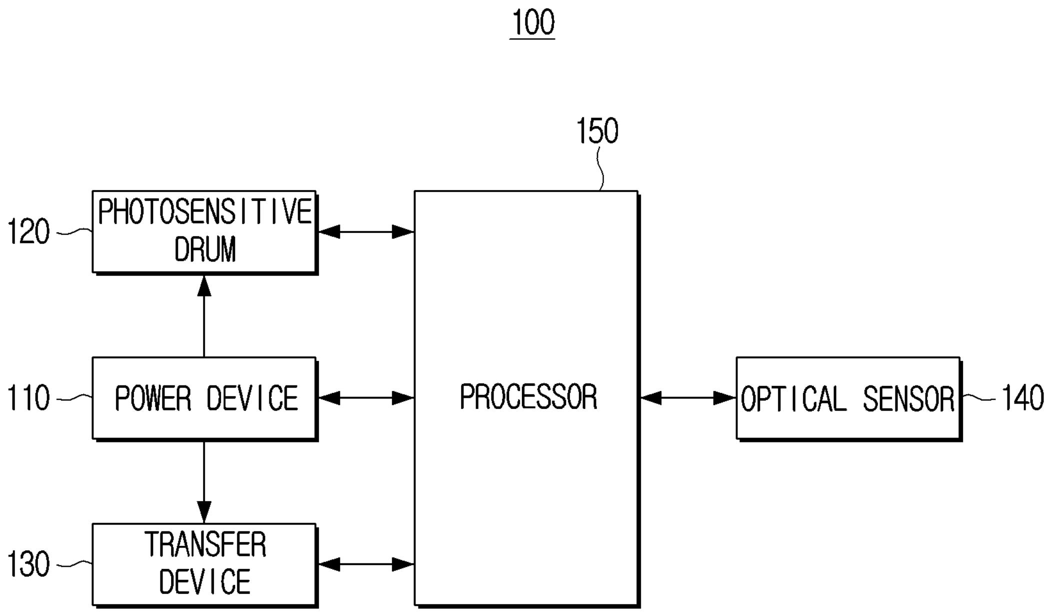
FIG. 2 is a block diagram illustrating an image forming apparatus according to an example.
Figure 3A:
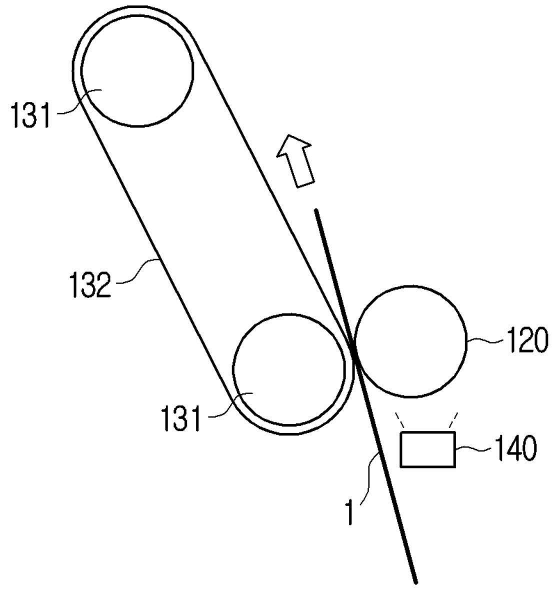
FIG. 3A is a diagram illustrating a printing engine of a black-and-white image forming apparatus according to an example.
Figure 3B:
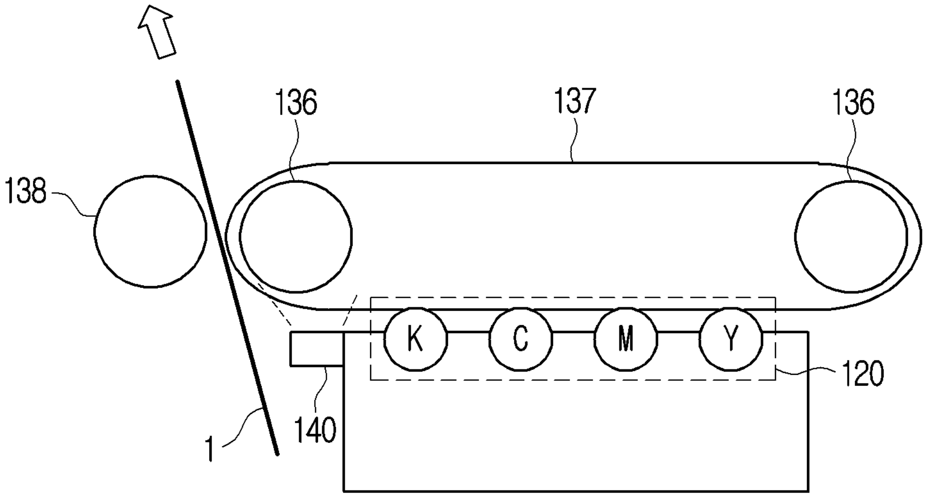
FIG. 3B is a diagram illustrating a printing engine of a color image forming apparatus according to an example.

FIG. 2 is a block diagram illustrating an image forming apparatus according to an example, FIG. 3A is a diagram illustrating a printing engine of a black-and-white image forming apparatus according to an example, and FIG. 3B is a diagram illustrating a printing engine of a color image forming apparatus according to an example. Hereinafter, an example will be described with reference to FIG. 2 to FIG. 3B.

Referring to FIG. 2, FIG. 3A, and FIG. 3B, the image forming apparatus 100 may include a power device 110, a photosensitive drum 120, a transfer device 130, an optical sensor 140, and a processor 150.

The power device 110 may apply a voltage to the photosensitive drum 120 according to control of the processor 150. For example, the photosensitive drum 120 may have a form of a roller. In a case in which the image forming apparatus 100 is to print in black and white, the photosensitive drum 120 may include one organic photo conductor (OPC). In a case in which the image forming apparatus 100 is to print in color, the photosensitive drum 120 may include a plurality of OPCs corresponding to a yellow (Y) color, a magenta (M) color, a cyan (C) color, and a black (K) color. The image forming apparatus 100 may apply a voltage of a set pattern to the photosensitive drum 120 by using the power device 110 and identify whether remaining toner (i.e., background) exists in the transfer device. For example, a voltage of a set pattern may be a voltage wherein a set number of times of applying a voltage, an application cycle, or a voltage size are changed.

The photosensitive drum 120 may transmit toner to the transfer device 130 based on the applied voltage. As an example, in a case in which the image forming apparatus 100 is to print in black and white, the transfer device 130 may include a transfer roller 131 and a transfer belt 132. In a case in which the image forming apparatus 100 is to print in color, the transfer device 130 may include an intermediate transfer roller 136, an intermediate transfer belt 137, and a transfer roller 138. In a case in which a background exists in the photosensitive drum 120, the photosensitive drum 120 may transmit remaining toner of a specific pattern to the transfer device 130 based on the voltage of the set pattern.

The transfer device 130 may transmit toner transmitted from the photosensitive drum 120. In case the image forming apparatus 100 performs an image forming job, the transfer device 130 may transfer the transmitted toner to a printing medium 1. In an example in which the image forming apparatus 100 identifies whether remaining toner exists in the transfer device 130, remaining toner of a specific pattern corresponding to the voltage applied to the photosensitive drum 120 may be formed in the photosensitive drum 120 or the transfer device 130. The optical sensor 140 may detect the remaining toner of the photosensitive drum 120 or the transfer device 130. For example, the optical sensor 140 may include a light emitting module and a light receiving module. The light emitting module of the optical sensor 140 may irradiate light on the remaining toner of a specific pattern formed in the photosensitive drum 120 or the transfer device 130, and the light receiving module may receive input of reflected light and detect the remaining toner. A signal detected by the optical sensor 140 may be transmitted to the processor 150, and the processor 150 may determine whether remaining toner exists based on the signal detected by the optical sensor 140.

The processor 150 may control an operation of the image forming apparatus 100. The processor 150 may change the surface potential of the photosensitive drum 120 by a voltage of a set pattern by using the power device 110. Also, the processor 150 may control the optical sensor 140 to detect whether remaining toner exists in the photosensitive drum 120 or the transfer device 130.

The processor 150 may acquire a size ratio of a periodic component based on the frequency of the signal detected by the optical sensor 140. In a case in which the acquired size ratio of the periodic component is greater than or equal to a specific size, the processor 150 may determine that remaining toner exists. The processor 150 may adjust the existing cleaning bias voltage by using an offset bias voltage corresponding to the size ratio of the periodic component based on an offset bias table. For example, remaining toner may have a negative charge. Accordingly, the cleaning bias voltage may be a negative voltage. The offset bias voltage may be a bias voltage that reduces the absolute value of the cleaning bias voltage. The cleaning bias voltage adjusted by the offset bias voltage may separate the remaining toner from the transfer device. The image forming apparatus 100 may include a cleaner (not shown) to clean the separated remaining toner.

In an example, although not illustrated in FIG. 2, the image forming apparatus 100 may include a memory to store various kinds of programs (or software) and an offset bias voltage table for use in operating the image forming apparatus 100, a display to display data such as an execution screen of an application program or a user interface, etc., a communication interface to communicate with an external apparatus, an input interface to receive an input such as selection of a function or a control instruction for the function from a user, a speaker to output a sound such as state information of the image forming apparatus 100, etc.

Hereinafter, an example process wherein the image forming apparatus 100 determines whether remaining toner exists and removes the remaining toner will be described.

Figure 4A:
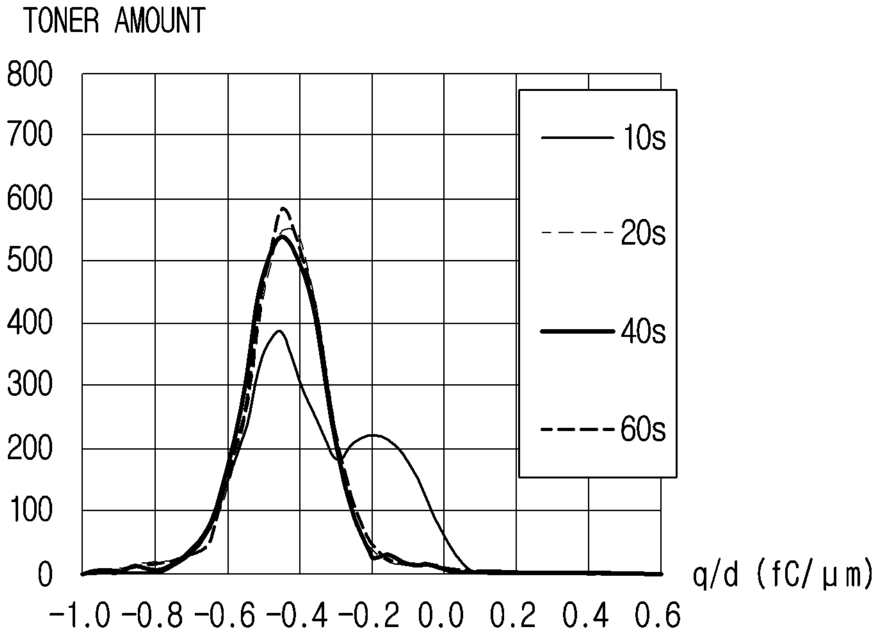
FIG. 4A is a diagram illustrating charge distribution of toner under a general condition according to an example.
Figure 4B:
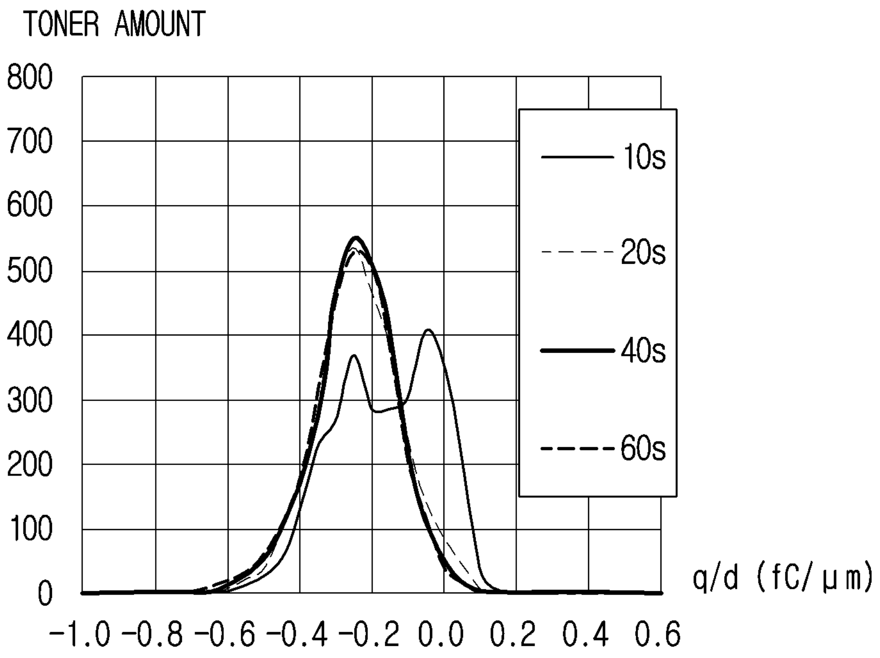
FIG. 4B is a diagram illustrating charge distribution of toner under a stress condition according to an example.

FIG. 4A is a diagram illustrating charge distribution of toner under a general condition according to an example, and FIG. 4B is a diagram illustrating charge distribution of toner under a stress condition according to an example. Hereinafter, an example will be described with reference to FIG. 4A and FIG. 4B.

For preventing generation of a background, pollution of toner may be removed from the transfer device. As an example, polluted toner on the transfer device may be removed by applying a voltage (or, a current) of the same polarity as that of the toner to the transfer device. However, in case the toner receives stress (e.g., the toner is not charged to a desired or expected level), the background may not be removed.

Referring to FIG. 4A, an example of charge distribution of toner in a normal state is illustrated. In a case of a normal state, a peak amount of toner may have a linear charge density of about −0.5 fC/μm. That is, in toner in a normal state, stressed toner (e.g., toner having a reverse polarity) may rarely occur and thus be measured in a miniscule amount, if measured at all.

Referring to FIG. 4B, an example of charge distribution of toner that received stress is illustrated. In toner that received stress, the amount of stressed toner (e.g., toner having a reverse polarity) may increase, and the center axis of charge distribution may move. Accordingly, the stressed toner having reverse polarity may pollute the photosensitive drum and the transfer device, and it may be difficult to remove the pollution of toner.

Figure 5:
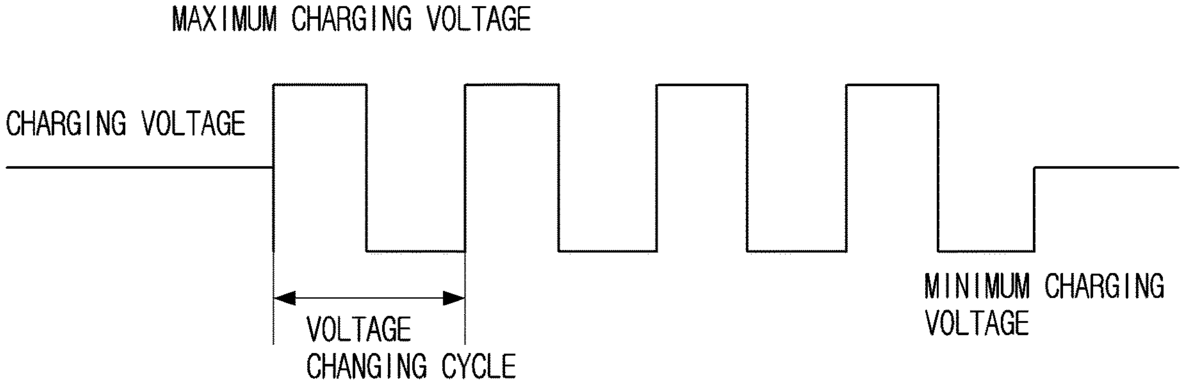
FIG. 5 is a diagram illustrating charge voltages applied to a photosensitive drum for measuring a background according to an example.
Figure 6:
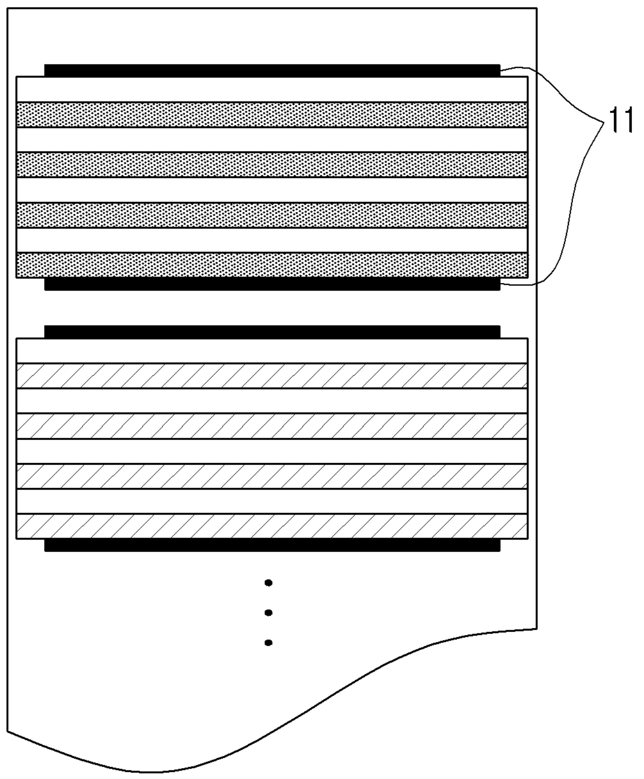
FIG. 6 is a diagram illustrating a background formed according to an example.

FIG. 5 is a diagram illustrating charge voltages applied to a photosensitive drum for measuring a background according to an example, and FIG. 6 is a diagram illustrating a background formed according to an example. Hereinafter, an example will be described with reference to FIG. 5 and FIG. 6.

The image forming apparatus may measure a background. In an example, measurement of a background may refer to detection of remaining toner of the photosensitive drum or the transfer device. For example, measurement of a background may be performed at a time point when the image forming apparatus is warming-up, a time point of tone reproduction curve (TRC) of the image forming apparatus, etc. For example, the time point of TRC may refer to a time point when the image forming apparatus periodically checks the image forming engine and adjusts the set value, etc. As an example, the time point of TRC may include a time point when an image forming job of greater than or equal to a threshold number of pages was performed, a time point when the image forming apparatus was turned on after being turned off for greater than or equal to a set time, etc.

Referring to FIG. 5, the image forming apparatus may change the surface potential of the photosensitive drum to a specific pattern by using the power device. For example, the specific pattern may be a pattern that changes the number of times of applying a voltage charging the photosensitive drum, the application cycle, the voltage size, etc. As an example, a voltage charging the photosensitive drum may be set as five times of application, a change cycle of 12 Hz, a maximum voltage of +1 PWM (Pulse Width Modulation) (+8V), and a minimum voltage of −1 PWM (−8V). In case a background is generated, a pattern of remaining toner may be formed in the photosensitive drum, and the formed pattern of the remaining toner may be transmitted to the transfer device.

When the image forming apparatus changes the surface potential of the photosensitive drum, the image forming apparatus may generate an exposure marker 11 for distinguishing the start and the end for each color. That is, the image forming apparatus may display an exposure marker 11 to distinguish the start and the end of an operation of detecting remaining toner on the photosensitive drum or the transfer device at the starting point and the ending point of providing a voltage of a set pattern. For example, when an image forming apparatus printing in black and white starts and ends an operation of identifying whether remaining toner exists, the exposure marker 11 may be formed on the surface of the photosensitive drum. When an image forming apparatus printing in color starts and ends an operation of identifying whether remaining toner exists for each color, the exposure marker 11 may be transmitted from the charged photosensitive drum to the transfer belt and formed on the transfer device. According to a change of the surface potential of the photosensitive drum for each color, toner of a specific pattern for each color may be transmitted to the transfer belt as illustrated in FIG. 6.

Remaining toner wherein a pattern has been formed may be detected by using an optical sensor (e.g., color tone detector (CTD) sensor). The image forming apparatus may perform frequency analysis for a signal of the pattern of the detected remaining toner. For example, the image forming apparatus may perform analysis by using an S wave in the case of Y, M, and C, and perform analysis by using a P wave in the case of K. For example, the image forming apparatus may convert a detected signal by fast Fourier transform (FFT), and acquire the magnitude of a periodic component, and the size ratio of the periodic component in the frequency area. The image forming apparatus may determine whether a background was generated based on the acquired size ratio of the periodic component. As an example, in a case in which the size ratio of the periodic component is greater than or equal to 20%, a background may be generated, and the size ratio of the periodic component and generation of a background may show a positive correlation. The image forming apparatus may adjust a cleaning bias voltage with an offset bias voltage based on the size ratio of the periodic component. The image forming apparatus may remove the background by applying the adjusted cleaning bias voltage to the transfer device. For example, the offset bias voltage may be a bias voltage that reduces the absolute value of the cleaning bias voltage.

Figure 7A:
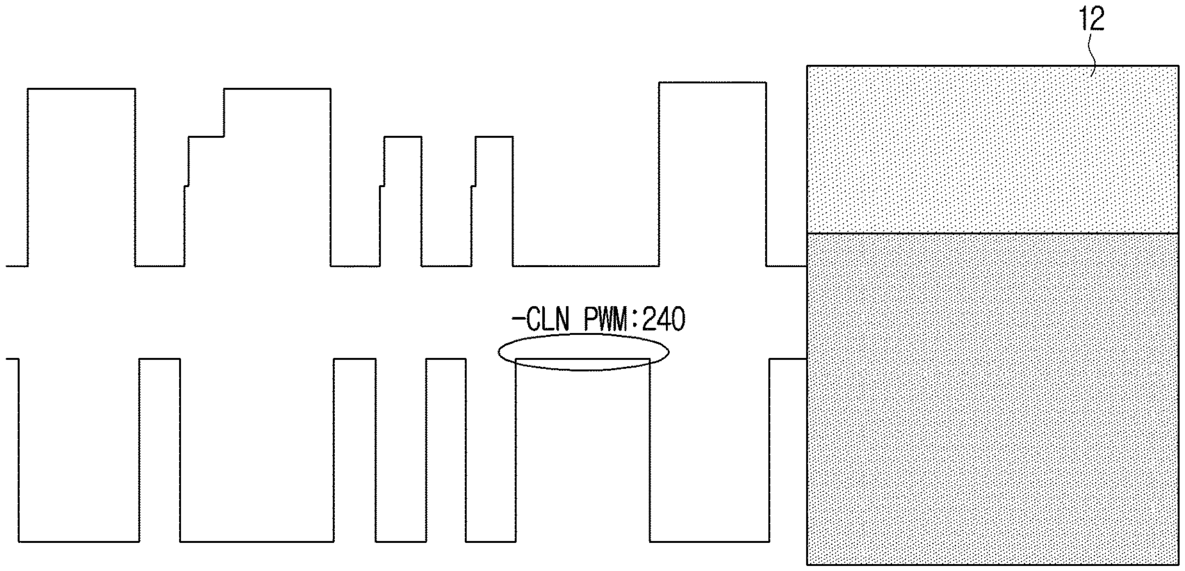
FIG. 7A is a diagram illustrating a general cleaning bias voltage according to an example.
Figure 7B:
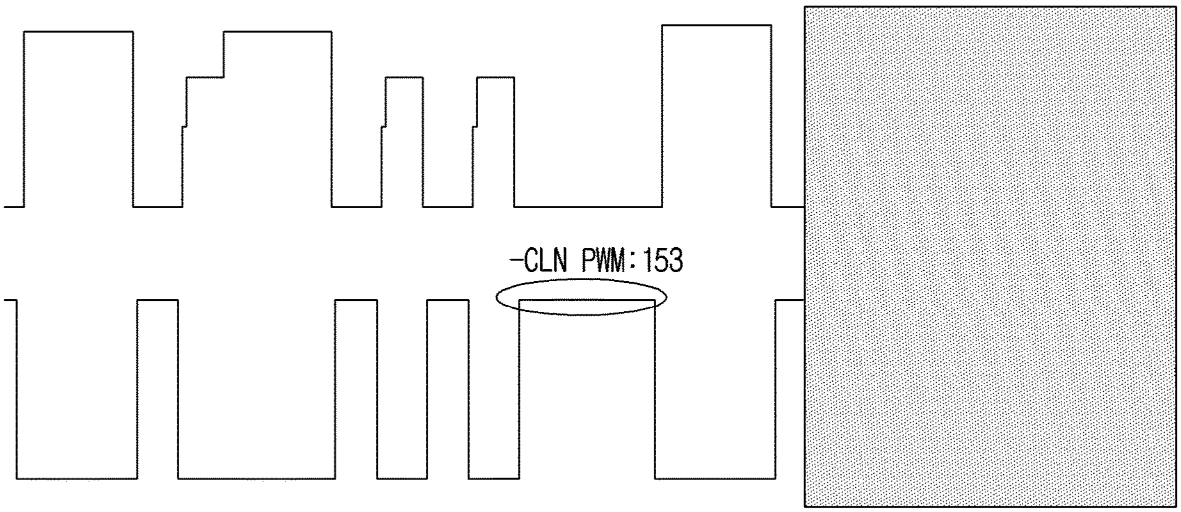
FIG. 7B is a diagram illustrating a cleaning bias voltage changed for removing a background according to an example.

FIG. 7A is a diagram illustrating a general cleaning bias voltage according to an example, and FIG. 7B is a diagram illustrating a cleaning bias voltage changed for removing a background according to an example. Hereinafter, an example will be described with reference to FIG. 7A and FIG. 7B.

FIG. 7A illustrates a state wherein toner receives stress, and pollution of a rear surface 12 occurs. As an example, the cleaning bias voltage may be 240 PWM (about −1000V). FIG. 7B illustrates a state wherein the cleaning bias voltage was increased to 153 PWM (about −600V) based on the acquired size ratio of the periodic component. When the image forming apparatus increases the cleaning bias voltage based on the acquired size ratio of the periodic component, the background may be removed.

FIG. 8 is a diagram illustrating an offset table of a cleaning bias voltage according to an example.

An example image forming apparatus may control a cleaning bias voltage based on variables of a printing environment. For example, the image forming apparatus may control a cleaning bias voltage in consideration of the acquired size ratio of the periodic component, the printing speed, the temperature, the humidity, etc. of the surrounding environment of the image forming apparatus. An offset bias voltage may have a positive correlation with at least one of the temperature or the humidity of the surrounding environment of the location in which the image forming apparatus is located. The image forming apparatus may store an offset table including the acquired size ratio of the periodic component and an offset bias voltage corresponding to the size ratio of the periodic component in consideration of variables of the printing environment. For example, the environment (ENV) 0 (the 0th environmental state) illustrated in FIG. 8 may correspond to an extremely low temperature environmental state. The environment (ENV) 8 (the 8th environmental state) may correspond to an environmental state under conditions of a temperature of greater than or equal to about 50° C. and humidity of about 100%. Also, an offset table may be generated while a pre section and a post section of a transfer section are distinguished.

If it is determined that the acquired size ratio of the periodic component is high, the image forming apparatus may increase the cleaning bias voltage as illustrated in the offset table. FIG. 8 illustrates a relation of an offset voltage that reduces the reference cleaning bias voltage to a PWM standard. As described above, the cleaning bias voltage is a (−) voltage, and thus an offset voltage that reduces the reference cleaning bias voltage to a PWM standard ultimately increases the cleaning bias voltage (e.g., adjusting from 240 PWM (−1000V) to 153 PWM (−600V)).

Figure 9:
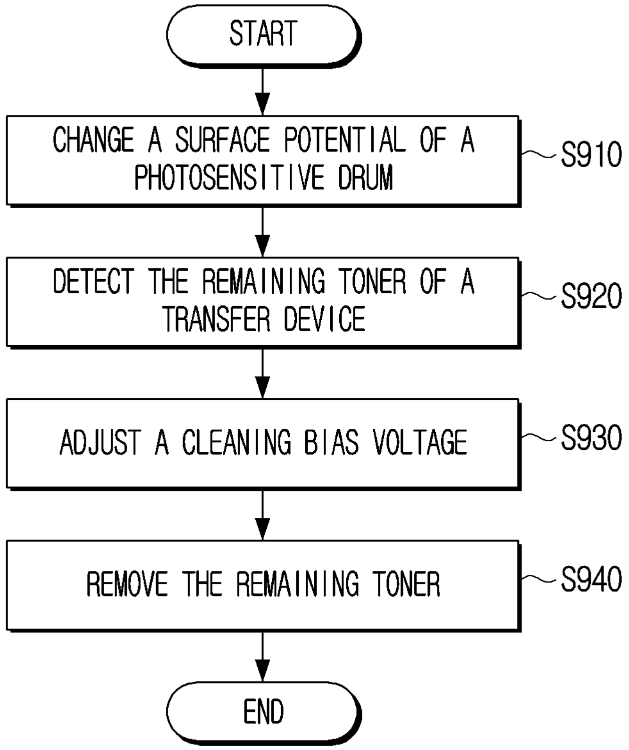
FIG. 9 is a diagram illustrating a flow chart of a method of controlling a cleaning bias voltage according to an example.

FIG. 9 is a diagram illustrating a flow chart of a method of controlling a cleaning bias voltage according to an example.

Referring to FIG. 9, the image forming apparatus may change the surface potential of the photosensitive drum according to a set pattern at operation S910. The image forming apparatus may provide a voltage of a set pattern to the photosensitive drum by changing the number of times of applying a voltage, the application cycle, the voltage size, etc. In an example, the image forming apparatus may display an exposure marker distinguishing the start and the end of an operation of detecting the remaining toner on the photosensitive drum or the transfer device at the starting point and the ending point of providing the voltage of the set pattern.

The image forming apparatus may detect remaining toner by acquiring a size ratio of a periodic component based on a frequency of a signal detected from the transfer device or the photosensitive drum at operation S920. For example, the image forming apparatus may perform an operation of identifying whether remaining toner exists at a time point of a warming-up operation, TRC, etc. The image forming apparatus may acquire the size ratio of the periodic component based on the frequency of a signal of the pattern of the remaining toner detected by using an optical sensor. In case the acquired size ratio of the periodic component is greater than or equal to a set size ratio, the image forming apparatus may determine that remaining toner exists.

In case the acquired size ratio of the periodic component is greater than or equal to a set size ratio, the image forming apparatus may adjust the cleaning bias voltage for removing the remaining toner based on an offset bias voltage corresponding to the size ratio of the periodic component at operation S930. For example, the offset bias voltage may be a bias voltage that reduces the absolute value of the cleaning bias voltage. Also, the offset bias voltage may be a voltage that changes according to the acquired size ratio of the periodic component, the printing speed, the temperature, or the humidity of the surrounding environment of the image forming apparatus. The offset bias voltage may be indicated as a positive correlation with the temperature and the humidity of the surrounding environment of the image forming apparatus.

In an example, the image forming apparatus may store an offset table including the size ratio of the periodic component and an offset bias voltage corresponding to the size ratio of the periodic component in the memory.

The image forming apparatus may remove the remaining toner by providing the adjusted cleaning bias voltage to the transfer device at operation S940. The transfer device may be provided with the cleaning bias voltage to which the offset bias voltage was applied from the power device according to control of the processor and remove the remaining toner that remains in the transfer device.

Figure 10:
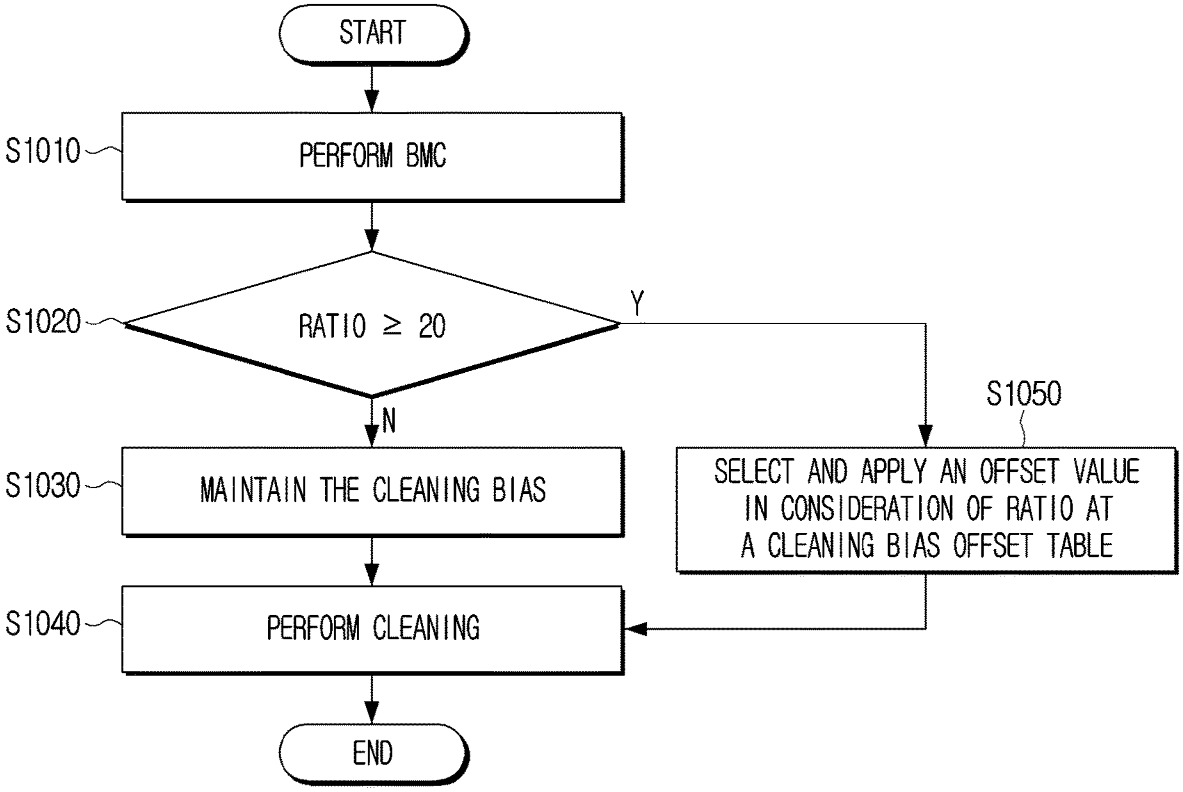
FIG. 10 is a diagram illustrating a flow chart of a process of performing cleaning of a background according to an example.

FIG. 10 is a diagram illustrating a flow chart of a process of performing cleaning of a background according to an example.

Referring to FIG. 10, the image forming apparatus may perform background margin control (BMC) at operation S1010. For example, the image forming apparatus may charge the photosensitive drum with a voltage of a set pattern, and detect the pattern of the remaining toner by the charging of the photosensitive drum. The image forming apparatus may perform frequency analysis based on the detected pattern of the remaining toner and acquire the size ratio of the periodic component.

The image forming apparatus may determine whether the size ratio of the periodic component is greater than or equal to 20 at operation S1020. If the size ratio of the periodic component is smaller than 20, the image forming apparatus may maintain the currently set cleaning bias voltage at operation S1030. The image forming apparatus may perform a cleaning process based on the set cleaning bias voltage at operation S1040.

On the other hand, if the size ratio of the periodic component is greater than or equal to 20, the image forming apparatus may apply an offset value corresponding to the size ratio of the periodic component in the stored cleaning bias offset table to the currently set cleaning bias voltage at operation S1050. That is, the image forming apparatus may adjust the cleaning bias voltage by applying an offset value to the currently set cleaning bias voltage. The image forming apparatus may perform a cleaning process of the transfer device based on the adjusted cleaning bias voltage at operation S1040.

Figure 11:
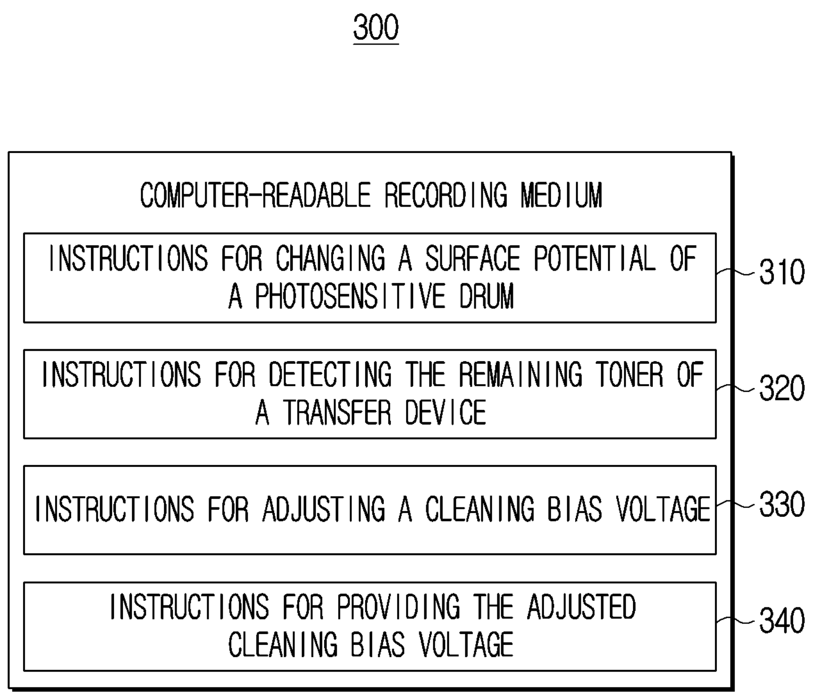
FIG. 11 is a diagram illustrating instructions stored in a computer-readable recording medium according to an example.

FIG. 11 is a diagram illustrating instructions stored in a non-transitory computer-readable recording medium according to an example of the disclosure.

The aforementioned example control process of a cleaning bias voltage executed in an image forming apparatus may be implemented in a form of a non-transitory computer-readable recording medium storing instructions that can be executed by a computer or a processor, or data. A non-transitory computer-readable recording medium 300 may store instructions related to the aforementioned example operations of an image forming apparatus. For example, the computer-readable recording medium 300 may include instructions 310 for changing a surface potential of a photosensitive drum to a voltage of a set pattern, instructions 320 for detecting remaining toner by acquiring a size ratio of a periodic component based on the frequency of a signal detected from a transfer device or a photosensitive drum, instructions 330 for adjusting a cleaning bias voltage used for removing remaining toner based on an offset bias voltage corresponding to a size ratio of a periodic component in case the acquired size ratio of the periodic component is greater than or equal to a set size ratio, and instructions 340 for removing remaining toner by providing an adjusted cleaning bias voltage to a transfer device.

Such a non-transitory computer-readable recording medium may include a read-only memory (ROM), a random-access memory (RAM), a flash memory, a CD-ROM, a CD-R, a CD+R, a CD-RW, a CD+RW, a DVD-ROM, a DVD-R, a DVD+R, a DVD-RW, a DVD+RW, a DVD-RAM, a BD-ROM, a BD-R, a BD-R LTH, a BD-Res, a magnetic tape, a floppy disk, a magneto-optical data storage apparatus, an optical data storage apparatus, a hard disk, a solid-state disk (SSD), and instructions or software, related data, data files, and data structures. Also, the non-transitory computer-readable recording medium may be any apparatus that can provide instructions or software, related data, data files, and data structures to a processor or a computer so that the processor or the computer can execute instructions.

While examples of the disclosure have been shown and described, the disclosure is not limited to the aforementioned examples, and it is apparent that various modifications can be made by those having ordinary skill in the art to which the disclosure belongs, without departing from the gist of the disclosure as claimed by the appended claims, and such modifications are within the scope of the descriptions of the claims.

What is claimed is:

1. An image forming apparatus comprising:

a power device;

a photosensitive drum;

a transfer device to remove remaining toner based on a cleaning bias voltage provided from the power device;

an optical sensor to detect remaining toner of the transfer device or the photosensitive drum; and a processor to:

change a surface potential of the photosensitive drum to a voltage of a set pattern by using the power device, acquire a size ratio according to a periodic component of a signal determined by the optical sensor, the signal indicative of the remaining toner of the transfer device, based on a frequency of the signal detected from the remaining toner by using the optical sensor, based on the acquired size ratio according to the periodic component being greater than or equal to a set size ratio, adjust the cleaning bias voltage based on an offset bias voltage corresponding to the acquired size ratio according to the periodic component, provide the adjusted cleaning bias voltage to the transfer device by using the power device to remove the remaining toner, and based on the acquired size ratio according to the periodic component being less than the set size ratio, provide the cleaning bias voltage to the transfer device by using the power device to remove the remaining toner.

2. The image forming apparatus of claim 1, wherein the processor is to provide the voltage of the set pattern by changing at least one of a voltage application cycle, a voltage size, or a set number of times of applying a voltage to the photosensitive drum by using the power device.

3. The image forming apparatus of claim 2, wherein the processor is to display an exposure marker that distinguishes a start and an end of an operation of detecting the remaining toner at a starting point and an ending point of providing the voltage of the set pattern.

4. The image forming apparatus of claim 1, wherein the processor is to detect the remaining toner at a time point of warming-up or a time point of tone reproduction curve (TRC) of the image forming apparatus.

5. The image forming apparatus of claim 1, wherein the offset bias voltage includes a bias voltage to reduce an absolute value of the cleaning bias voltage.

6. The image forming apparatus of claim 1, further comprising:

a memory to store an offset table including a size ratio of the periodic component and the offset bias voltage corresponding to the size ratio of the periodic component.

7. The image forming apparatus of claim 1, wherein the offset bias voltage changes according to the acquired size ratio of the periodic component, a printing speed, a temperature of a surrounding environment of a location of the image forming apparatus, or the humidity of the surrounding environment of the location of the image forming apparatus.

8. The image forming apparatus of claim 7, wherein the offset bias voltage is represented as a positive correlation with at least one of the temperature or the humidity of the surrounding environment of the location of the image forming apparatus.

9. A method of controlling a cleaning bias voltage, the method comprising:

changing a surface potential of a photosensitive drum to a voltage of a set pattern;

acquiring a size ratio according to a periodic component of a signal determined by an optical sensor, the signal indicative of remaining toner of a transfer device, based on a frequency of the signal detected from the transfer device or the photosensitive drum to detect the remaining toner;

based on the acquired size ratio according to the periodic component being greater than or equal to a set size ratio, adjusting a cleaning bias voltage for removing the remaining toner based on an offset bias voltage corresponding to the acquired size ratio according to the periodic component;

providing the adjusted cleaning bias voltage to the transfer device to remove the remaining toner; and based on the acquired size ratio according to the periodic component being less than the set size ratio, providing the cleaning bias voltage to the transfer device by using the power device to remove the remaining toner.

10. The method of controlling a cleaning bias voltage of claim 9, wherein the changing of the surface potential of the photosensitive drum comprises:

providing the voltage of the set pattern by changing at least one of a voltage application cycle, a voltage size, or a set number of times of applying a voltage to the photosensitive drum.

11. The method of controlling a cleaning bias voltage of claim 10, wherein the changing of the surface potential of the photosensitive drum comprises:

displaying an exposure marker to distinguish a start and an end of an operation of detecting the remaining toner at a starting point and an ending point of providing the voltage of the set pattern.

12. The method of controlling a cleaning bias voltage of claim 9, wherein the detecting of the remaining toner of the transfer device is performed at a time point of warming-up or a time point of tone reproduction curve (TRC) of the image forming apparatus.

13. The method of controlling a cleaning bias voltage of claim 9, wherein the offset bias voltage includes a bias voltage which reduces an absolute value of the cleaning bias voltage.

14. The method of controlling a cleaning bias voltage of claim 9, wherein the offset bias voltage changes according to the acquired size ratio of the periodic component, the printing speed, a temperature of a surrounding environment of a location of the image forming apparatus, or a humidity of the surrounding environment of the location of the image forming apparatus.

15. A non-transitory computer-readable recording medium including a program to perform a method of controlling a cleaning bias voltage, the non-transitory computer-readable recording medium comprising:

instructions to change a surface potential of a photosensitive drum to a voltage of a set pattern;

instructions to acquire a size ratio according to a periodic component of a signal determined by an optical sensor, the signal indicative of remaining toner of transfer device, based on a frequency of the signal detected from the transfer device or the photosensitive drum to detect the remaining toner;

instructions to, based on the acquired size ratio according to the periodic component being greater than or equal to a set size ratio, adjust a cleaning bias voltage for removing the remaining toner based on an offset bias voltage corresponding to the acquired size ratio according to the periodic component;

instructions to provide the adjusted cleaning bias voltage to the transfer device to remove the remaining toner; and instructions to, based on the acquired size ratio according to the periodic component being less than the set size ratio, provide the cleaning bias voltage to the transfer device by using the power device to remove the remaining toner.

* * * * *